United States Patent [19]
Barker, II

[11] Patent Number: 5,785,091
[45] Date of Patent: Jul. 28, 1998

[54] FLEXIBLE AIR DUCT WITH DIAMOND INTERLOCK SCRIM

[75] Inventor: Blaine F. Barker, II, Pearland, Tex.

[73] Assignee: Tele-Flow, Inc., Pearland, Tex.

[21] Appl. No.: 570,292

[22] Filed: Dec. 11, 1995

[51] Int. Cl.$^6$ ........................................ F16L 11/02
[52] U.S. Cl. ........................ 138/123; 138/133; 138/149
[58] Field of Search .......................... 138/123, 127, 138/131–134, 149

[56] References Cited

U.S. PATENT DOCUMENTS

| | | | |
|---|---|---|---|
| 746,319 | 12/1903 | Frees | 138/131 |
| 1,230,867 | 6/1917 | Cobb | 138/132 |
| 3,885,593 | 5/1975 | Koerber et al. | 138/149 |
| 4,410,014 | 10/1983 | Smith | 138/149 |
| 5,526,849 | 6/1996 | Gray | 138/134 |
| 5,607,529 | 3/1997 | Adamczyk et al. | 138/149 |

FOREIGN PATENT DOCUMENTS 81295 3/1956 Netherlands ............... 138/149

OTHER PUBLICATIONS

Attached Exhibit 1 provides a sample of a prior art vapor barrier jacket containing scrim, which was manufactured by Goodman Manufacturing of Houston, Texas. The prior art scrim of Exhibit 1 has a rectangular reinforcement pattern where scrim yarns intersect at a 90 degree angle, no date.

*Primary Examiner*—Stephen F. Gerrity
*Attorney, Agent, or Firm*—Pravel, Hewitt, Kimball & Krieger

[57] ABSTRACT

A flexible insulated air duct is provided with a core of a helical wire encapsulated in a tape, an insulation blanket wrapped around the core, and a jacket with a diamond interlock scrim on the outside of the insulation blanket. The jacket is comprised of an inside layer, a diamond-interlock scrim, a parallel scrim, and an outer coat layer. The diamond-shaped scrim has yarns arranged in a criss-crossed pattern, while the parallel scrim has yarns arranged in parallel. The criss-crossed yarns are made from a heavier gauge material with better tensile strength than that of the parallel yarns. The inside layer, the parallel and criss-crossed yarns, and the outer layer are laminated together using an adhesive. The completed jacket is pulled over the insulation blanket and the inner core to form a flexible air duct having a jacket with a diamond interlock scrim.

15 Claims, 1 Drawing Sheet

FLEXIBLE AIR DUCT WITH DIAMOND INTERLOCK SCRIM

BACKGROUND OF THE INVENTION

1. Field of the Invention

The present invention relates to a flexible air duct with a jacket, and more particularly, relates to an air duct jacket with a diamond interlock scrim.

2. Description of the Related Art

In a building, air motion is one variable which can be controlled to counteract temperature or humidity extremes affecting the comfort level of building occupants. As the differential between the indoor and outdoor pressure may not create sufficient air movement throughout the building, forced air ventilation through the injection of air over a system of ducts with a fan is often used. Additionally, air conditioning and heating equipment may be used in conjunction with the fan to provide a better control of temperature, humidity and air motion over the ducts.

Historically, builders have specified sheet metal air ducts. However, sheet metal air ducts, which are generally rectangular in cross-section and are made from sheet metal, suffer from poor maneuverability which adds significant labor cost to the installation. Additionally, the cost and the weight of sheet metal air ducts are undesirable. Although rigid fiberglass air ducts can be used to overcome the weight and the cost issues associated with sheet metal air ducts, builders still face the same maneuverability complications associated with the installation of sheet metal air ducts. Recently, flexible air ducts have emerged as a cost-effective substitute to rigid fiberglass air ducts. Initially used in only small diameter branch runs, flexible air ducts are now being used as the main trunk for the distribution of air in the building. The elasticity of flexible air ducts makes the installation process less cumbersome than the installation of sheet metal or rigid fiberglass air ducts and thus results in a less expensive installation.

A flexible insulated air duct commonly includes a core having a helical wire encapsulated in a tape. The helical wire and tape combination defines an air passage structure for providing forced air ventilation. As the temperature of air carried within the core of the air duct may differ from ambient temperature, a layer of insulation is typically wrapped around the core to reduce the energy loss arising from the transmission of heated or cooled air over the air duct. Finally, a jacket is provided on the outside of the insulation for aesthetic as well as protective purposes. However, as the outer jacket is quite thin, it is subject to being punctured and torn by sharp objects such as nails, splinters, or sharp metal edges as may be encountered on the floor of the building attic during the installation process. Additionally, the air duct may encounter sharp objects on a truss or other board which may have a splinter or even a nail projecting outwardly from the truss. These sharp objects can penetrate into the jacket and rip the core of the duct so as to destroy the utility of the air duct.

One solution to minimize the potential damage to the outer jacket provides a scrim, or a weave, having parallel yarns within the jacket. When the flexible air duct with the parallel scrim is pulled to the intended installation location over a sharp object, the reinforced jacket offers more resistance to tearing. However, in jackets with a parallel patterned scrim, once a sharp object penetrates into the jacket, the protective scrim may unravel upon a continued pulling of the flexible air duct because nothing exists to stop the sharp object's advances.

2

An alternate solution deploys a jacket having a scrim with a rectangular reinforcement pattern where scrim yarns intersect at 90 degree angles to provide a checkerboard pattern. Although the scrim with the rectangular pattern cannot stop the sharp object from penetrating the jacket, the rectangular pattern prevents the jacket from unravelling. As long as the jacket is not completely unravelled, installers can usually repair the opening with a suitable duct tape and thus save the flexible air duct. However, the rectangular pattern requires more yarns and more manufacturing time to create the parallel and intersecting patterns. As such, the jacket with the rectangular scrim is more expensive to produce. Thus, a need exists for a jacket having a scrim pattern which is economical to manufacture and yet capable of preventing the jacket from unravelling upon encountering a sharp object.

SUMMARY OF THE INVENTION

In accordance with the invention, a flexible insulated air duct is provided with a core of a helical wire encapsulated in a tape, an insulation blanket wrapped around the core, and a jacket on the outside of the insulation blanket. The jacket further comprises an inside layer, a diamond interlock scrim, a parallel scrim, and an outer layer. The diamond-shaped scrim has yarns arranged in a criss-crossed pattern. The criss-crossed yarns are made from a heavy gauge material. The parallel scrim has yarns arranged in a parallel manner, with the yarns having a lighter gauge and lower tensile strength than that of the criss-crossed yarns of the diamond interlock scrim. The inside layer, the parallel and criss-crossed yarns, and the outer layer are laminated together using an adhesive. The completed jacket is pulled over the insulation blanket and the inner core. The resulting jacket with the diamond interlock scrim requires less material and less weaving time, leading to cost savings while maintaining the objective of preventing the flexible air duct jacket from unravelling when punctured by a sharp object.

BRIEF DESCRIPTION OF THE DRAWINGS

The invention is more fully described hereinafter with reference to the accompanying drawings, in which.

DETAILED DESCRIPTION OF THE PREFERRED EMBODIMENT

Figure 1:
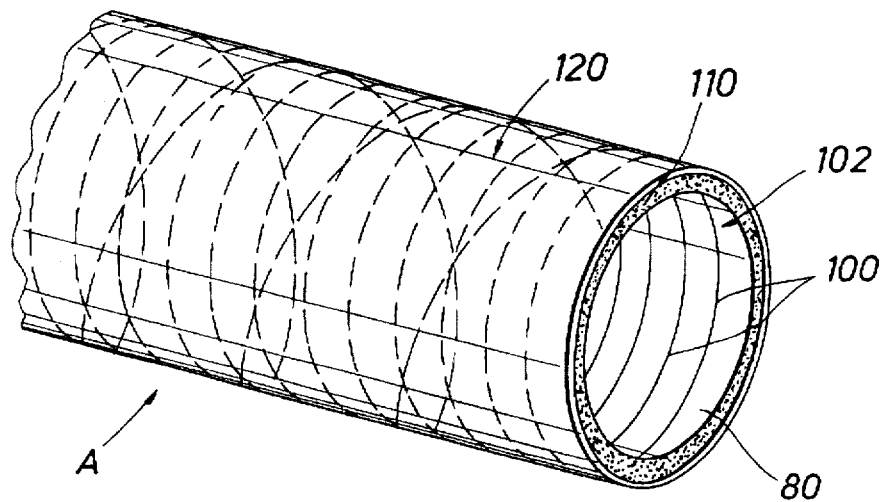
FIG. 1 is a perspective view illustrating the flexible air duct of the present invention.

Referring to the drawings and more particularly to FIG. 1, a flexible air duct generally designated as A of the present invention is disclosed. In FIG. 1, the flexible insulated air duct has an air conducting core 80 which is defined by a helical wire 100, enclosed in a tape 102. The helical wire 100 provides the mechanical support for the air conducting core 80, while the tape 102 isolates the air in the core 80 from the atmosphere and further to prevent dust or other matters from contaminating the air flow. The helical wire 100 is preferably a spring steel wire that is encapsulated in the tape 102 which is preferably a plastic film or other suitable polymer material. An insulation blanket 110, typically made of glass fiber and conforming to ASTM C-518, is wrapped on the outside of the helical wire 100 and tape 102 combination to insulate the air inside the duct from the ambient temperature.

Finally, a jacket 120 is pulled over the insulation blanket 110 to provide protection against tearing by sharp objects.

Figure 2:
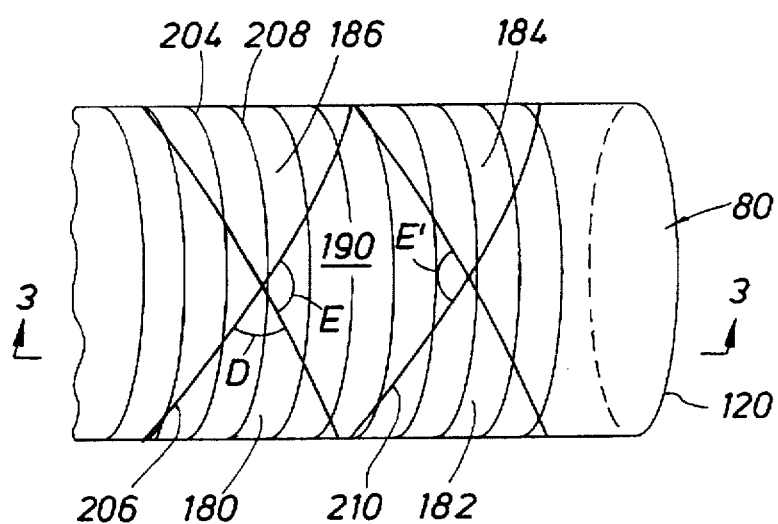
FIG. 2 is a perspective side view of the yarns of the jacket of the flexible air duct.
Figure 3:
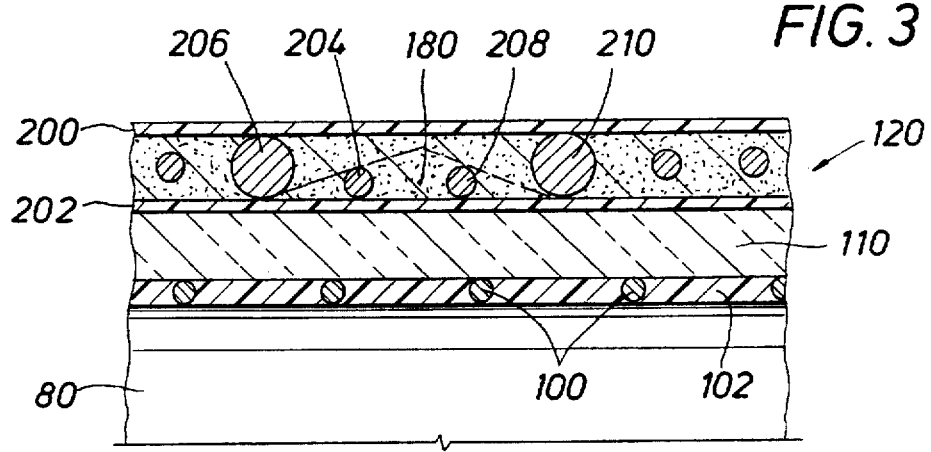
FIG. 3 is a cross-sectional view of the jacket of the present invention.

FIGS. 2 and 3 illustrate in more detail the outer jacket of the flexible air duct of the present invention. Turning to FIGS. 2 and 3, the jacket 120 is illustrated in conjunction with the insulation blanket and the helical wire 100. FIG. 2 shows a parallel scrim comprising parallel yarns 204, 208, and a diamond interlock scrim comprising criss-crossed yarns 206, 210. Preferably, the criss-crossed yarns 206, 210 are comprised of a heavier gauge material which provides stronger tensile strength than the material for the parallel yarns 204 and 208. Fiberglass yarns can be used as the material for parallel yarns 204, 208 and for criss-crossed yarns 206, 210. The criss-crossing of yarns 206 and 210 creates, among others, diamond-shaped cells 180–190, each having four equal sides with oppositely positioned acute angles D and D' (not shown) and obtuse angles E–E'. The acute angles D and D' are each preferably less than ninety degrees, while the obtuse angles E and E' are each preferably greater than ninety degrees. As shown in FIG. 2, the criss-crossing yarns 206 and 210 are positioned over the same area occupied by the parallel yarns 204 and 208.

FIG. 3 shows a cross-section of the upper portion of the flexible air duct A along lines 3—3. As shown in FIG. 3, the jacket 120 comprises an inner layer 202, the parallel scrim with parallel yarns 204, 208, the diamond interlock scrim with criss-crossed yarns 206, 210, and an outer layer 200. The inner layer 202 is a clear polyester tape available from DuPont, ICI, or American Hoechst. The clear polyester tape 202 is slit to 2.5" width. The outer layer is a metallized polyester tape, or a film with metal deposition. Preferably, the metallized polyester film is a 48 gauge film available from DuPont, ICI, or American Hoechst. The 48 gauge film is slit to 2.75" width. Sandwiched between the inner layer 202 and the outer layer 200 is a plurality of parallel yarns 204 and 208 woven in a continuous helical pattern as shown in FIG. 2. The outer layer 200, yarns 204–210, and inner layer 202 are laminated together using an adhesive. Preferably, the adhesive is U-Car-Latex 154, available from Union Carbide Corp.

During manufacturing, each of the clear tape of the inner layer 202 and the metallized tape of the outer layer 200 is uncoiled from its supplied form and goes through a glue reservoir which applies an adhesive film to the tape. Each tape travels through a heating oven which removes the humidity from the tape and renders the tape tacky. The tape travels through a series of rollers which reverses the tape so that the tape surfaces lay against each other. Eventually, the tape hits a head, or a series of rollers set in a certain diameter dimension, to form the jacket. The parallel scrim is then applied to the product using a series of mandrels that feed the scrim to produce a parallel pattern. Additionally, another fixture criss-crosses the scrim to form a diamond pattern across the parallel scrim. The fixture is controlled so that the revolutions are timed properly and the pattern is held such that regardless of the dimension of the jacket, the fixture holds a certain pattern to provide the diamond-like appearance and keep it criss-crossed and across the parallel scrim. The criss-crossed scrim generates a pattern with a plurality of diamond-shaped cells 180–190 with acute angles D and D' (not shown) and obtuse angles E–E'. The scrims are laminated between the two series of tape. This series of operation continues until a 25 foot jacket has been produced. A cutting mechanism severs the completed jacket. The operator recoils the completed jacket, ties it in a bundle, and starts the process for the next jacket.

The finished jackets are rolled into a level round roll and subsequently moved to a final finishing table for installation over the insulation 110 and the core 80. The insulation 110 also is supplied in a level round roll. During final assembly, the jacket 120 and the insulation 110 are uncoiled. The core 80 is inserted inside the insulation 110 and the jacket 120 is then pulled over the insulation to form a completed flexible air duct A having a jacket with a diamond interlock scrim.

During the installation of the flexible air duct, when a sharp object such as a nail punctures the jacket 120, the sharp object cuts a path leading toward the perimeter of the diamond cell 180 as defined by the criss-crossing yarns 206 and 210. Initially, the cutting of the jacket by the sharp object is resisted by the plurality of parallel yarns 204, 208 located within the area defined by the diamond-shaped cell 180 of the diamond interlock scrim. If the sharp object continues to cut through the jacket, the object moves to the perimeter of the diamond cell 180 where the heavier gauge yarns 206 and 210 of the diamond cell 180 provide greater resistance to constrain the object to the perimeter of the cell until a sufficiently large force pushes the object into the next diamond-shaped cell. Along the way, the sharp object collects a number of yarns 204, 210 in its path which collectively resists further advances by the sharp object and offers sufficient resistance to the sharp object that the object may exit the jacket entirely. In this manner, the jacket with the diamond interlock scrim of the present invention localizes the tear to the individual diamond-shaped cell 180 and prevents the jacket from completely unravelling. As long as the jacket is not completely unravelled, the jacket opening can be repaired with a suitable duct tape. Thus, the diamond-shaped scrim prevents the sharp object from completely destroying the particular piece of duct.

The foregoing disclosure and description of the invention are illustrative and explanatory thereof, and various changes in the size, shape, materials, components, yarn elements, tapes and scrims, as well as in the details of the illustrated jacket and construction may be made without departing from the spirit of the invention.

What is claimed is:

1. A flexible insulated air duct comprising:
    a flexible inner core including a wire helix with spaced convolutions and a tape, said wire helix laminated in said tape;
    an insulation blanket wrapped around said flexible inner core; and
    a jacket covering the outer surface of said insulation blanket, said jacket including:
        an inner layer;
        an outer layer;
        a parallel scrim; and
        a criss-crossed scrim, said parallel and criss-crossed scrims laminated between said inner and outer layers.

2. The flexible insulated air duct of claim 1, wherein said inner core is cylindrical in shape.

3. The flexible insulated air duct of claim 1, wherein said wire helix is a spring steel wire.

4. The flexible insulated air duct of claim 1, wherein said insulation blanket conforms to ASTM C-518.

5. The flexible insulated air duct of claim 1, wherein said insulation blanket is made from glass fiber.

6. The flexible insulated air duct of claim 1, wherein said tape is a polyester material.

7. The flexible insulated air duct of claim 1, wherein the inner layer is a clear tape.

8. The flexible insulated air duct of claim 7, wherein said clear tape is a polyester material.

9. The flexible insulated air duct of claim 1, wherein the outer layer is a metallized tape.

10. The flexible air duct of claim 9, wherein said metallized tape is a polyester material.

11. The flexible insulated air duct of claim 1, wherein said scrims are comprised of fiberglass yarns.

12. The flexible insulated air duct of claim 1, wherein said parallel scrim uses smaller gauge yarns than the gauge of the yarns of said criss-crossed scrim.

13. The flexible insulated air duct of claim 1, wherein said criss-crossed scrim comprises a plurality of diamond interlock cells.

14. The flexible insulated air duct of claim 1, wherein said parallel scrim has a plurality of parallel yarns and wherein said criss-crossed scrim has a plurality of yarns arranged as diamond shaped cells, each of said diamond-shaped cells overlaying at least two of said parallel yarns.

15. A flexible insulated air duct comprising:
a flexible inner core including a wire helix with spaced convolutions and a tape, said wire helix laminated in said tape;
an insulation blanket wrapped around said flexible inner core; and
a jacket covering the outer surface of said insulation blanket, said jacket including:
an inner layer;
an outer layer;
a criss-crossed scrim having a plurality of diamond-shaped cells, each of said diamond-shaped cells having a pair of oppositely positioned obtuse angles and a pair of oppositely positioned acute angles; and
a parallel scrim, said parallel and criss-crossed scrims laminated between said inner and outer layers.

* * * * *